United States Patent Office 3,202,614
Patented Aug. 24, 1965

3,202,614
PROCESS FOR BREAKING PETROLEUM EMULSIONS
Willard H. Kirkpatrick, Sugar Land, and Virgil L. Seale, Houston, Tex., assignors to Nalco Chemical Company, Chicago, Ill., a corporation of Delaware
No Drawing. Filed June 25, 1962, Ser. No. 205,063
10 Claims. (Cl. 252—342)

This application is a continuation-in-part of our copending application Serial No. 818,561, which is a continuation-in-part of our copending application Serial No. 600,667, filed July 30, 1956, both abandoned. This invention, in general, relates to the treatment of emulsions of mineral oil and water, such as petroleum emulsions commonly encountered in the production, handling and refining of crude petroleum oil for the purpose of separating the oil from the water.

Petroleum emulsions are, in general, of the water-in-oil type wherein the oil acts as a continuous phase in which are dispersed finely divided particles of naturally occurring waters or brines. These emulsions are often extremely stable and will not resolve on long standing. It is to be understood that water-in-oil emulsions may occur artificially, resulting from any one or more of numerous operations encountered in various industries. The emulsions obtained from producing wells and from the bottom of crude oil storage tanks are commonly referred to as "cut oil," "emulsified oil," "bottom settlings" and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

One object of our invention is to provide a novel and economical process for resolving emulsions of the character referred to into their component parts of oil and water or brine.

Another object is to provide processes for breaking petroleum oil emulsions with novel reagents which are interfacial and surface-active.

The treating agents employed in accordance with the present invention consist of compositions of high molecular weight which are organic polycarboxy acid mixed esters of (a) oxyethylated organic-solvent-soluble phenol-formaldehyde condensation products of a difunctional monoalkyl phenol, the alkyl group having between 4 and 15 carbons inclusive and being in the ortho or para position and (b) polyoxyalkylene glycols having a molecular weight of at least 1200 and usually not greater than 7500. Dialkyl monofunctional phenols are not suitable for purposes of this invention, but amounts up to 25% dialkyl phenol in the difunctional monoalkyl phenol may be tolerated. The weight ratio of ethylene oxide to the phenol-formaldehyde condensation product will, for most applications, fall between about 2.5:1 and 1:2.5 respectively. The polyoxyalkylene glycols may be either polyoxypropylene glycol or a mixed oxide glycol of propylene oxide and ethylene oxide where the weight ratio of oxyethylene to oxypropylene does not exceed 4:1. The weight ratio of the oxyethylated phenol-formaldehyde condensation product to polyoxyalkylene glycol in the resulting mixed esters of the polycarboxy acid should be in the range of 1:5 to 5:1, preferably at least 1:4.

PHENOL-FORMALDEHYDE CONDENSATION

The phenol-formaldehyde condensation products are prepared by reacting formaldehyde or a substance which breaks down to formaldehyde under the reaction conditions, e.g., paraformaldehyde and trioxane, and a difunctional, monoalkyl phenol, such as a substantially pure ortho- or para-monoalkyl phenol or a crude alkyl phenol consisting of at least 75% difunctional phenol, by heating the reactants in the presence of a small amount of acid catalysts such as sulfamic acid. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form and heating is continued for an additional number of hours until at least about one mol of aqueous distillate per mol of reactants has been secured. The product is permitted to cool to yield the phenol-formaldehyde condensation product in a hydrocarbon solvent. The molecular weight of these intermediate condensation products cannot be ascertained with certainty, but we would approximate that they contain about 3 to 15 phenolic nuclei per resin molecule. The solubility of the condensation product in hydrocarbon solvents such as $SO_2$ extract would indicate that the resin is a linear type polymer, thus distinguishing them from the more common phenol-formaldehyde resins of the cross-linked type.

The phenol component of our phenol-formaldehyde resins is entirely or principally a difunctional phenol—one having only two of the three normally reactive ortho- and para-positions available for reaction with the formaldehyde. These phenols are mono-alkyl phenols with the alkyl group in the para- or ortho-position having up to about 15 carbons. Phenols suitable for our invention are difunctional, mono-alkyl phenols having straight chain or branch chain alkyl groups of 4–15 carbons, preferably 5–15 carbons. Examples of the phenolic component include such preferred phenols as p-tertiary butyl phenol, p-tertiary hexyl phenol, p-tertiary octyl (1,1,3,3-tetramethyl butyl-1) phenol, p-nonyl phenol, p-dodecyl phenol, a crude alkyl phenol containing about 90% p-nonyl phenol and 10% dinonyl phenol, and others including mixtures of ortho- and/or para-monoalkyl phenols and crude alkylate phenols containing at least 75% difunctional alkyl phenols with the remainder being primarily monofuctional phenols.

The intermediate phenol-formaldehyde condensation products used in preparing the compositions of this invention and methods of their preparation are illustrated in the following examples. All parts are by weight unless otherwise designated.

*Example A*

In a three-necked reaction flask provided with means of mechanical stirring and a return condenser system permitting the removal of any aqueous phase formed in the course of reaction, there is added 1500 parts of a crude alkylate phenol which comprises an undistilled p-nonyl phenol containing approximately 10% of dinonylphenol, 25 parts paraformaldehyde and 3 parts sulfamic acid which is present as a catalyst in the reaction. The reaction mass is heated, and at 108° C. an aqueous distillate begins to form. After three hours heating at approximately 110° C., the mass becomes quite viscous and is permitted to cool to about 100° C. At this point 600 parts of $SO_2$ extract is added and heating resumed. Again at 110° C. further aqueous distillate begins to form and heating is continued for an additional three hours, or until approximately 141 cc. of aqueous distillate has been secured at a maximum temperature of 212° C. The product is permitted to cool to yield the finished phenol-formaldehyde condensation product.

Example B

In a manner similar to Example A, 1000 parts of the crude alkylate phenol, 120 parts of paraformaldehyde and 2 parts sulfamic acid were heated 2 hours at 105–110° C. to permit reaction of the phenol and formaldehyde under conditions minimizing formaldehyde loss. At temperatures above 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of $SO_2$ extract is added. Heating is continued for an additional three hours or until a total of about 75 parts of aqueous distillate have been removed at maximum temperature of 212° C. to yield the finished phenol-formaldehyde condensation product.

Example C

In a manner similar to Examples A and B, 1000 parts of the crude alkylate phenol, 90 parts paraformaldehyde and 2 parts sulfamic acid are carefully reacted at temperatures of 100–110° C. When the reaction mass becomes quite viscous, the reaction is permitted to cool, and 400 parts of $SO_2$ extract is added and heating resumed for an additional hour or until a total of 55 parts of aqueous distillate have been secured at maximum temperature of 213° C.

Example D

To a vessel having a stirrer and a return condenser system permitting the removal of the aqueous phase of the distillate is added 1400 parts of p-tertiary butyl phenol, 310 parts of paraformaldehyde and 3 parts of sulfamic acid as catalyst. The mass is heated, and at about 105–110° C. an aqueous distillate begins to form. After heating for three hours at 105–110° C., the mass becomes viscous and is permitted to cool to 95–100° C. About 500 parts of a suitable hydrocarbon fraction is added and heating is resumed. At 105–110° C., further distillate begins to form and heating is continued for an additional three hours until approximately 140 cc. of aqueous distillate is obtained. The product is cooled to yield the phenol-formaldehyde resin solution in the hydrocarbon vehicle.

Example E

Following the technique of Example D, an equivalent mount of p-tertiary hexyl phenol is substituted for the p-tertiary butyl phenol of Example D.

OXYETHYLATION OF THE CONDENSATION PRODUCTS

Having prepared the intermediate phenol-formaldehyde products, the next step is oxyethylation of said condensation products. This is achieved by mixing the intermediate condensation product in a hydrocarbon solvent with a small amount of a suitable catalyst in an autoclave. The condensation product is heated above 100° C., and ethylene oxide is charged into the autoclave until the pressure is in the vicinity of 75 to 100 p.s.i. The reaction mixture is gradually heated until an exothermic reaction begins. The external heating is then removed, and ethylene oxide is added at such a rate that the temperature is maintained between about 150–160° C. in a pressure range of 80 to 100 p.s.i. After all of the ethylene oxide has been added, the temperature is maintained for an additional 10 to 20 minutes to assure substantially complete reaction of the ethylene oxide. The resulting product is the ethylene oxide adduct of an alkyl phenol-formaldehyde condensation product, in which the weight ratio of the ethylene oxide to the phenol-formaldehyde condensation product is between about 2.5:1 and 1:2.5, respectively.

Our oxyethylated, alkyl phenol-formaldehyde condensation products and methods of their preparation are illustrated in the following examples wherein all parts are by weight unless otherwise stated.

Example F

In an autoclave having a two-liter capacity equipped with a means of external electric heating, internal cooling coils and mechanical agitation, there is charged 400 parts of the condensation product of Example A and 2 parts of sodium hydroxide. Into a transfer bomb there is introduced 835 parts ethylene oxide. The condensation product is heated to 135° C., and the ethylene oxide is charged into the reactor until reactor pressure is 80 p.s.i. The reaction mixture is gradually heated until an exothermic reaction begins to take place. The external heating is then removed and ethylene oxide is then added at such a rate that the temperature is maintained between 150°–160° C. with a pressure range of 80 to 100 p.s.i. After approximately six hours all of the oxide has been added to the autoclave, and the temperature is maintained for an additional 15 minutes to make certain that the unreacted oxide is reduced to a minimum. The resulting product is the ethylene oxide adduct of a phenol-formaldehyde condensate, in which the ratio of oxide to condensate by weight is 2 to 1.

Example G

In a manner similar to Example F, the ethylene oxide adduct of the condensation product of Example A was prepared in which the ratio of ethylene oxide to condensation product was 2 to 3 by weight.

Example H

In a manner similar to Example F, the ethylene oxide adduct of the condensation product of Example B was prepared in which the ratio of ethylene oxide to condensation product was 1.5 to 1 by weight.

Example J

In a manner similar to Example F, the ethylene oxide adduct of the condensation product of Example B was prepared in which the ratio of ethylene oxide to condensation product was 2 to 1 by weight.

Example K

In a manner similar to Example F, the ethylene oxide adduct of the condensation product of Example C was prepared in which the ratio of ethylene oxide to condensation product was 1.5 to 1 by weight.

Example L

In a manner similar to Example F, the ethylene oxide adduct of the condensation product of Example C was prepared in which the ratio of ethylene oxide to condensation product was 2 to 1 by weight.

Example M

In a manner similar to Example F, the ethylene oxide adduct of the resin of Example D is prepared in which the weight ratio of ethylene oxide to condensation product is 1 to 1.

Example N

In a manner similar to Example F, the ethylene oxide adduct of the condensation product of Example E is prepared in which the weight ratio of ethylene oxide to condensation product is 1.5 to 1.

ESTERIFICATION OF OXYETHYLATED CONDENSATION PRODUCTS AND POLYALKYLENE GLYCOLS WITH POLYCARBOXY ACIDS

The next and final step in the preparation of the compositions of our invention is the esterification of an organic, polycarboxy acid, or in some instances the anhydride thereof, with the oxyethylated phenol-formaldehyde condensation products previously described and polyoxyalkylene glycols having a molecular weight of at least 1200. The weight ratio of the oxyethylated condensation product to the polyoxyalkylene glycol is 5:1 to 1:5, preferably 4:1 to 1:4. The polyoxyalkylene glycol may be either polyoxypropylene glycol or an oxyethylene, oxypropylene glycol wherein the weight ratio of oxyethylene to oxypropylene does not exceed 4:1. In most cases the esterification reaction preferably is carried out by sequentially adding first the polyoxyalkylene glycol and then the oxyethylated phenol-formaldehyde condensation product. The polycarboxy acid and polyalkylene glycol are heated until an aqueous distillate begins to form. Heating is continued until sufficient aqueous distillate has been secured to indicate that the esterification is complete. The mass is then cooled to about 150° C. at which point the oxyethylated phenol-formaldehyde condensation product is added. Heating is then resumed and continued until sufficient aqueous distillate has been secured to indicate completion of the esterification. After cooling, a suitable hydrocarbon fraction such as $SO_2$ extract is added to yield the polycarboxy acid mixed ester of the polyoxyalkylene glycol and the oxyethylated phenol-formaldehyde condensation product in a hydrocarbon carrier.

It is to be noted that the esterification reaction should be carried out step-wise particularly where the oxyethylated condensation product contains as much as 1.5 parts of ethylene oxide per one part by weight of the condensation product. This precaution is also necessary with ratios of ethylene oxide to phenol-formaldehyde resin lower than 1.5 in the case of resins having more than about 4 phenolic nuclei per molecule. In some instances simultaneous reaction of the oxyethylated condensation product and the polyoxyalkylene glycol is permissible, but experimentation is essential in order to avoid formation of infusible insoluble resin materials.

The polycarboxy acids are aliphatic, cycloaliphatic or aromatic polycarboxy acids. We generally prefer dicarboxy acids having 2–10 carbons although acids of higher molecular weight are within the scope of our compositions. Polycarboxy acids or anhydrides thereof which may be used in the esters of our invention include oxalic, maleic, malonic, succinic, diglycolic, adipic, azelaic, sebacic, fumaric, citric, tartronic, malic, camphoric tartaric, phthalic and terephthalic acids or anhydrides, dimerized fatty acids, VR-1 acid and others.

Emery dimer acid is essentially dilinoleic acid and is a polymer made by polymerizing an unsaturated fatty acid containing at least two nonconjungated double bonds. Such acids may also be described as polymer drying oil acids. The term "drying oil acid" is used herein to mean an unsaturated fatty acid containing at least two double bonds and at least six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymer acids are available as by-product materials. Thus, one source of the polymeric acids suitable for the purposes of this invention is the still residue of the dry distillation of castor oil in the presence of sodium hydroxide. VR-1 acid is an acid of this type.

VR-1 acid is a mixture of polycarboxy acids, with an average molecular weight of about 1,000. It has an average of slightly more than two carboxylic acid groups per molecule. It is a by-product acid, and is a dark amber, rather viscous liquid. A typical sample of VR-1 acid gave the following analysis:

| | |
|---|---|
| Acid number | 150 |
| Iodine number | 36 |
| Saponification number | 172 |
| Unsaponifiable matter | present 3.7, 3.5 |
| Moisture content | do 0.86 |

The invention will be further illustrated in the following examples wherein the parts are by weight unless otherwise indicated.

*Example I*

In a three-necked reaction flask provided with means of mechanical stirring and a return condenser system permitting the removal of any aqueous phase formed in the course of reaction, there is added 400 parts of a polypropylene glycol having a molecular weight of 2000, 55 parts of diglycolic acid and 50 parts of $SO_2$ extract. The reaction mass is heated to 195° C. at which point an aqueous distillate begins to form. Heating is continued until approximately 8 parts by weight of aqueous distillate has been secured. The mass is cooled and results in the diglycolic ester of a polyoxypropylene glycol having a molecular weight of 2000. When the cooling has reached 150° C., 90 parts of the oxyethylated condensation product of Example F is added. Heating is then resumed, and at 210° C. an aqueous distillate begins to form. Heating is continued until 3 parts of an aqueous distillate have been secured in approximately one hour at a maximum temperature of 270° C. After some cooling, 350 parts of $SO_2$ extract is added to yield the mixed diglycolic ester of a polyoxypropylene glycol and an oxyethylated phenol-formaldehyde condensate in the hydrocarbon carrier.

*Example II*

In a manner similar to Example I, 400 parts of a polyoxyalkylene glycol prepared by adding terminally 8 mols of ethylene oxide to a polyoxypropylene glycol having a molecular weight of 2000, 50 parts of diglycolic acid and 50 parts of $SO_2$ extract are heated to eliminate approximately 7 parts of an aqueous distillate yielding the diglycolic ester of a polyalkylene glycol. To this ester there is added 100 parts of the oxyethylated condensation product of Example F, and heating is continued to remove an additional 1.6 parts of aqueous distillate. Then 350 parts of $SO_2$ extract is added to yield the finished mixed diglycolic ester of a polyoxyalkylene glycol and an oxyethylated phenol-formaldehyde condensate in the hydrocarbon carrier.

*Example III*

In a manner similar to Example I, 300 parts of a polyoxypropylene glycol having a molecular weight of 2000, 45 parts of diglycolic acid and 50 parts of $SO_2$ extract are heated to eliminate 6.2 parts of an aqueous distillate at a maximum temperature of 269° C. To this ester there is added 200 parts of the oxyethylated condensation product of Example G, and heating is continued until an additional 2 parts of an aqueous distillate is secured at a maximum temperature of 220° C. Then 350 parts of $SO_2$ extract is added to the mass to yield the finished mixed diglycolic ester of a polyoxypropylene glycol and an oxyethylated phenol-formaldehyde condensate in the hydrocarbon carrier.

*Example IV*

In a manner similar to Example I, 325 parts of a polyoxyalkylene glycol prepared by adding terminally 4 mols of ethylene oxide to a polyoxypropylene glycol having a molecular weight of 2000, 35 parts diglycolic acid and 50 parts of a suitable hydrocarbon extract are heated to eliminate 7.5 parts of an aqueous distillate at a maximum temperature of 268° C. To the ester so prepared there is added 150 parts of the oxyethylated condensation product of Example H, and heating is continued to remove an additional 4 parts of an aqueous distillate. Then 350 parts of a suitable hydrocarbon extract is added to yield the finished mixed diglycolic ester of a polyoxyalkylene glycol and an oxyethylated phenol-formaldehyde condensate in the hydrocarbon carrier.

*Example V*

In a manner similar to Example I, 500 parts of a polyoxypropylene glycol having a molecular weight of 2000, 55 parts diglycolic acid and 50 parts of SO₂ extract are heated to eliminate 4.7 parts of an aqueous distillate at a maximum temparture of 268° C. To the ester so prepared there is added 150 parts of the oxyethylated condensation product of Example H, and heating is continued to remove an additional 4 parts of an aqueous distillate. Then 350 parts of SO₂ extract is added to yield the finished mixed diglycolic ester of a polyoxypropylene glycol and an oxyethylated phneol-formaldehyde condensate in the hydrocarbon carrier.

*Example VI*

In a manner similar to Example I, 350 parts of a polyoxyalkylene glycol having a molecular weight of approximately 3500, prepared from mixed oxides in which the weight ratio of propylene oxide to ethylene oxide is 3 to 1, 45 parts diglycolic acid and 50 parts of SO₂ extract are heated to eliminate approximately 7 parts of an aqueous distillate at a maximum temperature of 268° C. To the ester so prepared, 150 parts of the oxyethylated condensation product of Example H is added, and heating resumed to remove an additional 1.2 parts of an aqueous distillate. Then 350 parts of SO₂ extract is added to yield the finished mixed diglycolic ester of a polyoxyalkylene glycol and an oxyethylated phenol-formaldehyde condensate in the hydrocarbon carrier.

*Example VII*

In a manner similar to Example I, 150 parts of a polyoxypropylene glycol having a molecular weight of 1200, 45 parts diglycolic acid and 50 parts of SO₂ extract are heated to eliminate approximately 7 parts of an aqueous distillate at a maximum temperature of 268° C. To the ester so prepared there is added 150 parts of the oxyethylated condensation product of Example J, and heating is continued to remove approximately 1.5 parts of aqueous distillate. Then 350 parts of SO₂ extract is added to yield the finished mixed diglycolic ester of a polyoxypropylene glycol and an oxyethylated phenol-formaldehyde condensate in the hydrocarbon carrier.

*Example VIII*

In a manner similar to Example I, 350 parts of a polyoxyalkylene glycol, prepared by adding 8 mols of ethylene oxide to a polyoxypropylene glycol having a molecular weight of 2000, 45 parts diglycolic acid and 50 parts of SO₂ extract are heated to eliminate approximately 6 parts of an aqueous distillate at a maximum temperature of 272° C. To the ester so prepared there is added 150 parts of the oxyethylated condensate of Example J, and heating is resumed to remove an additional 1.9 parts of an aqueous distillate. Then 350 parts of SO₂ extract is added to yield the finished mixed diglycolic ester of a polyoxyalkylene glycol and an oxyethylated phenol-formaldehyde condensate in the hydrocarbon solvent.

*Example IX*

In a manner similar to Example I, 400 parts of a polyoxypropylene glycol having a molecular weight of 2000, 55 parts of diglycolic acid and 50 parts of SO₂ extract are heated to eliminate about 7.5 parts of an aqueous distillate at a maximum temperature of 270° C. To the ester so prepared there is added 100 parts of the oxyethylated condensation product of Example K, and heating is continued to remove an additional 3.7 parts of an aqueous distillate. Then 350 parts of SO₂ extract is added to yield the finished mixed diglycolic ester of a polyoxypropylene glycol and an oxyethylated phenol-formaldehyde condensate in the hydrocarbon carrier.

*Example X*

In a manner similar to Example I, 350 parts of a polyoxyalkylene glycol prepared by adding 8 mols of ethylene oxide to a polyoxypropylene glycol having a molecular weight of 2000, 45 parts of diglycolic acid and 50 parts of SO₂ extract are heated to eliminate 6 parts of an aqueous distillate at a maximum temperature of 268° C. To the ester so prepared there is added 150 parts of the oxyethylated condensation product of Example K, and heating is continued to remove an additional 3.6 parts of an aqueous distillate. Then 350 parts of SO₂ extract is added to yield the finished mixed diglycolic ester of a polyoxyalkylene glycol and an oxyethylated phenol-formaldehyde condensate in the hydrocarbon carrier.

*Example XI*

In a manner similar to Example I, 350 parts of a polyoxyalkylene glycol prepared by adding 6 mols of ethylene oxide to a polyoxypropylene glycol having a molecular weight of 2700, 45 parts of diglycolic acid and 50 parts of SO₂ extract are heated to eliminate approximately 6 parts of an aqueous distillate at a maximum temperature of 270° C. To the ester so prepared 150 parts of the oxyethylated condensation product of Example K is added and heating is continued to remove an additional 3.6 parts of an aqueous distillate. Then 350 parts of SO₂ extract is added to yield the finished mixed diglycolic ester of a polyoxyalkylene glycol and an oxyethylated phenol-formaldehyde resin.

*Example XII*

In a manner similar to Example I, 350 parts of a polyoxyalkylene glycol prepared by adding 8 moles ethylene oxide to a polyoxypropylene glycol having a molecular weight of 2000, 45 parts of diglycolic acid and 40 parts of SO₂ extract are heated to eliminate 6 parts of an aqueous distillate at a maximum temperature of 264° C. To the ester so prepared there is added 150 parts of the oxyethylated condensation product of Example K, and heating is continued to remove an additional 3.7 parts of an aqueous distillate. Then 350 parts of SO₂ extract is added to yield the finished mixed diglycolic ester of a polyoxyalkylene glycol and an oxyethylated phenol-formaldehyde condensate in the hydrocarbon carrier.

*Example XIII*

In Examples I to XII, inclusive, diglycolic acid is replaced by a mol equivalent of maleic anhydride to yield the corresponding mixed maleate esters of a polyoxyalkylene glycol and an oxyethylated phenol-formaldehyde resin.

*Example XIV*

In Examples I to XII, inclusive, diglycolic acid is replaced by a mol equivalent of phthalic anhydride to yield the corresponding mixed phthalate esters of a polyoxyalkylene glycol and an oxyethylated phenol-formaldehyde resin.

*Example XV*

In a manner similar to Example I, 100 parts of a polyoxypropylene glycol having a molecular weight of about 6000, 55 parts of diglycolic acid and 50 parts of SO₂ extract are heated to eliminate about 2.5 parts of an aqueous distillate at a maximum temperature of 245–250° C. To the ester so prepared is added 350 parts of the oxyethylated condensation product of Example H, and heating is continued to remove an additional 11 parts of aqueous distillate. Then 350 parts of SO₂ extract is added to yield the finished mixed diglycolic ester of the polyoxypropylene glycol and the oxyethylated phenol-formaldehyde condensate in the hydrocarbon carrier.

*Example XVI*

In a manner similar to Example I, 75 parts of polyoxypropylene glycol having a molecular weight of 2000, 50 parts of succinic acid and 50 parts of $SO_2$ extract are heated to eliminate about 7.2 parts of an aqueous distillate. To the ester so prepared is added 100 parts of the oxyethylated product of Example M, and heating is continued to remove an additional 3.5 parts of aqueous distillate. Then 300 parts of $SO_2$ extract is added to yield the finished succinic acid ester of the polyoxypropylene glycol and the oxyethylated phenol-formaldehyde condensate in the hydrocarbon carrier.

*Example XVII*

In a manner similar to Example I, 400 parts of polyoxypropylene glycol (1200 mol. wt.) to which has been adducted about 15 mols of ethylene oxide, 70 parts of sebacic acid, and 60 parts of $SO_2$ extract are heated to eliminate about 5.5 parts of aqueous distillate. To the ester so prepared is added 150 parts of the oxyethylated product of Example N, and heating is continued to remove an additional 3.6 parts of aqueous distillate. The product is formulated by the addition of 350 parts of $SO_2$ extract to give a solution in the hydrocarbon carrier of the mixed sebacic acid ester of a polyoxyalkylene glycol and the oxyethylated phenol-formaldehyde condensation product.

*Example XVIII*

In a manner similar to Example I, there is prepared the dilinoleic acid mixed ester of the polyoxypropylene glycol and the oxyethylated phenol-formaldehyde resin of Example I by substituting an equivalent amount of dilinoleic acid for the diglycolic acid.

The mixed esters of our invention are prepared by the reaction of a polycarboxy acid, preferably a dicarboxy acid or anhydride, at a mol ratio of 1 to 2 mols of the acid per mol of both oxyethylated phenol-formaldehyde resin and polyoxyalkylene glycol. The products of esterification range from di-esters of the dicarboxy acids to polyesters of relatively low order of polymerization.

Among the suitable hydrocarbon vehicles which can be employed as diluents or solvents in the foregoing reactions is sulfur dioxide extract. This material is a by-product from the Edeleanu process of refining petroleum in which the undesirable fractions are removed by extraction with liquid sulfur dioxide. After removal of the sulfur dioxide a mixture of hydrocarbons is substantially aromatic in character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The invention is hereby claimed as follows:

1. A process for breaking emulsions of the water-in-oil type which comprises subjecting the emulsion to the action of an organic, dicarboxy acid mixed ester of (a) an oxyethylated, organic-solvent-soluble mono-alkyl phenol-formaldehyde condensation product, the alkyl group having between 5 and 15 carbons inclusive, the weight ratio of ethylene oxide to condensation product falling between about 2.5:1 and 1:2.5, respecitvely, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyethylated condensation product to polyoxyalkylene glycol being at least 1:4 and not more than 4:1, respectively, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

2. A process for beraking emulsions of the water-in-oil type which comprises subjecting the emulsion to the action of an organic, dicarboxy acid mixed ester of (a) an oxyethylated, organic-solvent-soluble mono-alkyl phenol-formaldehyde condensation product, the alkyl group having between 4 and 15 carbons inclusive, the weight ratio of ethylene oxide to condensation product falling between about 2.5:1 and 1:2.5, resepectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyethylated condensation product to polyoxyalkylene glycol being in the range of 5:1 to 1:5, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

3. A process for breaking emulsions of the water-in-oil type which comprises subjecting the emulsion to the action of an organic, dicarboxy acid mixed ester of (a) an oxyethylated organic-solvent-soluble alkyl phenol-formaldehyde condensation product, said alkyl phenol being primarily a mono-alkyl phenol containing not greater than about 25% dialkyl phenol, the alkyl group having between 5 and 15 carbons inclusive, the weight ratio of ethylene oxide to condensation product falling between about 2.5:1 and 1:2.5, respectively, and (b) a polyoxyalkylene glycol having a molecular weight of at least 1200, said glycol selected from the group consisting of polyoxypropylene glycol and oxyethylene, oxypropylene glycol in a weight ratio of ethylene oxide to propylene oxide not exceeding 4:1, the weight ratio of oxyethylated condensation product to polyoxyalkylene glycol being in the range of 1:5 to 5:1, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

4. A process for breaking emulsions of the water-in-oil type which comprises subjecting the emulsion to the action of an organic dicarboxy acid mixed ester of (a) an oxyethylated organic-solvent-soluble alkyl phenol-formaldehyde condensation product, said phenol being essentially a mono-alkyl phenol, the alkyl group having between 5 and 15 carbons inclusive, the weight ratio of ethylene oxide to condensation product falling between about 2.5:1 and 1:2.5 respectively, and (b) polyoxypropylene glycol having a molecular weight of at least 1200, the weight ratio of oxyethylated condensation product to polyoxypropylene glycol being in the range of 1:5 to 5:1, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

5. A process for breaking emulsions of the water-in-oil type which comprises subjecting the emulsion to the action of an organic, dicarboxy acid mixed ester of (a) an oxyethylated organic-solvent-soluble alkyl phenol-formaldehyde condensation product, said alkyl phenol being essentially a mono-alkyl phenol, the alkyl group having between 5 and 15 carbons inclusive, the weight ratio of ethylene oxide to condensation product falling between about 2.5:1 and 1:2.5, respectively, and (b) a polyoxyalkylene glycol comprising oxyethylene, oxypropylene glycol in a ratio of oxyethylene to oxypropylene not exceeding 4:1, the weight ratio of oxethylated condensation product to polyoxyalklene glycol being in the range of 1:5 to 5:1, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

6. A process for breaking emulsions of the water-in-oil type which comprises subjecting the emulsion to the action of an organic, dicarboxy acid mixed ester of (a) an ethylene oxide adduct of an organic-solvent-soluble alkyl phenol-formaldehyde condensation product, said alkyl phenol being primarily a mono-alkyl phenol containing not greater than about 25% dialkyl phenol, the alkyl group having between 5 and 15 carbons inclusive, the weight ratio of ethylene oxide to condensation product falling between about 2.5:1 and 1:2.5, respectively, and (b) polyoxypropylene glycol having a molecular weight of at least 1200, the weight ratio of oxyethylated condensation product to polyoxypropylene glycol being in the range of 1:5 to 5:1, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

7. A process for breaking emulsions of the water-in-oil type which comprises subjecting the emulsion to the action of an organic dicarboxy acid mixed ester of (a) an ethylene oxide adduct of an organic-solvent-soluble alkyl phenol-formaldehyde condensation product, said alkyl phenol being primarily a mono-alkyl phenol containing not greater than about 25% dialkyl phenol, the alkyl group having between 5 and 15 carbons inclusive, the weight ratio of ethylene oxide to condensation product falling between about 2.5:1 and 1:2.5, respectively, and (b) a polyoxyalkylene glycol comprising oxythylene, oxypropylene glycol in a weight ratio of oxyethylene to oxypropylene not exceeding 4:1, the weight ratio of oxyethylated condensation product to polyoxyalkylene glycol being in the range of 1:5 to 5:1, and the dicarboxy acid nuclei of said ester having the carboxyl groups thereof esterified with both components (a) and (b), the mol ratio in said ester of said dicarboxy acid to the total mols of (a) and (b) being in the range of 1–2:1, respectively, and said ester having a degree of esterification in the range of a diester of said dicarboxy acid to polyesters of low order of polymerization.

8. A process for breaking emulsions of the water-in-oil type which comprises subjecting the emulsion to the action of a diglycolic acid mixed ester of (a) and oxyethylated, organic-solvent-soluble mono-alkyl phenol-formaldehyde condensation product, the alkyl group having between 5 and 15 carbons inclusive, the weight ratio of ethylene oxide to condensation product falling between about 2.5:1 and 1:2.5, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyethylated condensation product to polyoxyalkylene glycol being in the range of 1:5 to 5:1, and the diglycolic acid nuclei of said ester having the carboxyl groups thereof esterified with both components (a) and (b), the mol ratio in said ester of said diglycolic acid to the total mols of (a) and (b) being in the range of 1–2:1, respectively, and said ester having a degree of esterification in the range of a diester of said diglycolic acid to polyesters of low order of polymerization.

9. A process for breaking emulsions of the water-in-oil type which comprises subjecting the emulsion to the action of a maleic acid mixed ester of (a) an oxyethylated, organic-solvent-soluble mono-alkyl phenol-formaldehyde condensation product, the alkyl group having between 5 and 15 carbons inclusive, the weight ratio of ethylene oxide to condensation product falling between about 2.5:1 and 1:2.5, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyethylated condensation product to polyoxyalkylene glycol being in the range of 1:5 to 5:1, and the maleic acid nuclei of said ester having the carboxyl groups thereof esterified with both components (a) and (b), the mol ratio in said ester of said maleic acid to the total mols of (a) and (b) being in the range of 1–2:1, respectively, and said ester having a degree of esterification in the range of a diester of said maleic acid to polyesters of low order of polymerization.

10. A process for breaking emulsions of the water-in-oil type which comprises subjecting the emulsion to the action of a phthalic acid mixed ester of (a) an oxyethylated, organic-solvent-soluble mono-alkyl phenol-formaldehyde condensation product, the alkyl group having between 5 and 15 carbons inclusive, the weight ratio of ethylene oxide to condensation product falling between about 2.5:1 and 1:2.5, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxyethylated condensation product to polyoxyalkylene glycol being in the range of 1:5 to 5:1, and the phthalic acid nuclei of said ester having the carboxyl groups thereof esterified with both components (a) and (b), the mol ratio in said ester of said phthalic acid to the total mols of (a) and (b) being in the range of 1–2:1, respectively, and said ester having a degree of esterification in the range of a diester of said phthalic acid to polyesters of low order of polymerization.

References Cited by the Examiner

UNITED STATES PATENTS

| | | | |
|---|---|---|---|
| 2,454,544 | 11/48 | Bock et al. | 260—53 |
| 2,454,545 | 11/48 | Bock et al. | 252—342 |
| 2,541,999 | 2/51 | De Groote et al. | 252—342 |
| 2,766,213 | 10/56 | Dickson | 252—342 |
| 2,841,563 | 7/58 | Kirkpatrick et al. | 252—342 |

JULIUS GREENWALD, *Primary Examiner.*